United States Patent [19]

LaBounty

[11] Patent Number: 4,522,323
[45] Date of Patent: Jun. 11, 1985

[54] RAIL LIFTING AND BREAKING MACHINE

[76] Inventor: Roy E. LaBounty, 1607 8th Ave., Two Harbors, Minn. 55616

[21] Appl. No.: 517,632

[22] Filed: Jul. 27, 1983

[51] Int. Cl.³ .......................... B26F 3/00; B23P 17/02
[52] U.S. Cl. ...................................... 225/2; 104/7 R; 225/96.5; 225/103
[58] Field of Search .................... 225/96, 96.5, 2, 103; 104/2 R, 7 R

[56] References Cited

U.S. PATENT DOCUMENTS

| 344,735 | 6/1886 | Hill et al. | 225/96 X |
| 1,430,916 | 10/1922 | Mason et al. | 104/7 R |
| 2,309,262 | 1/1943 | Thies | 104/7 R |
| 4,346,828 | 8/1982 | Crawley | 225/2 |
| 4,383,630 | 5/1983 | Solomon et al. | 225/1 X |
| 4,444,345 | 4/1984 | Solomon et al. | 225/103 X |

FOREIGN PATENT DOCUMENTS

| 602320 | 3/1978 | U.S.S.R. | 225/96.5 |
| 831430 | 5/1981 | U.S.S.R. | 225/96.5 |
| 941027 | 7/1982 | U.S.S.R. | 225/96.5 |

Primary Examiner—Frank T. Yost
Attorney, Agent, or Firm—Palmatier, Sturm, Sjoquist & Baker, Ltd.

[57] ABSTRACT

A railroad track rail lifting and breaking machine having a mobile frame to be drawn along the bed of a railroad track, runners directing downward thrust onto the ties, guides for directing the rails upwardly over the frame and runners and through a slide, the slide having clamps for clamping to the rails, there also being pressure shoes for bearing against the inner sides of the rails when clamped to break the rails, and a notching blade for producing nicks on the inner sides of the rails opposite the anvils over which the rails are broken by the pressure shoes.

15 Claims, 12 Drawing Figures

RAIL LIFTING AND BREAKING MACHINE

This invention relates to a machine for handling railroad tracks which are being removed from the rail beds and then formed into short lengths for ease of handling.

BACKGROUND OF THE INVENTION

There are miles and miles of unused railroad track from which the rails need to be taken so that the steel can be reprocessed and used for other purposes. Often the wooden ties can also be salvaged to be used for other purposes.

In the past, in taking up railroad track from the bed, the handling of the extremely long lengths of rail has presented a substantial problem. Traditionally, it has been thought necessary that the steel rails need to be cut with an acetylene torch. Such cutting of the rails proves to be extremely expensive because it is extremely time consuming and wasteful of significant amounts of fuel.

As a result, the rails are handled in long lengths, and the handling of such long lengths requires the use of extremely heavy equipment for lifting, loading and transporting the rails.

Scrap yards have collected long lengths of rails for processing in such scrap yards. They have actually tried to break such rails by placing a rail over a fulcrum or the edge of an anvil such that the base flange of the rail rests upon a support at one side of the anvil and the rail extends substantially horizontally, as a cantilever, in the other direction from the anvil, whereupon the one end is held downwardly against the support or anvil; and the cantilever end is pressed downwardly as to break the rail over the edge of the anvil or at the fulcrum. Although some rails have been broken in this way, considerable difficulty is experienced in handling and holding down the rails and in the actual breaking of the cantilever ends of the rails.

SUMMARY OF THE INVENTION

An object of the invention is to provide a machine which will readily break rails lifted from the bed of a railroad track as to accommodate handling of the rails for transport and reprocessing into other steel products.

Another object of the invention is to provide a machine for substantially simultaneously lifting the rails from the bed of a railroad track and from the wooden ties and to immediately break such rails into short lengths that may be easily handled as with a magnet or a grapple.

A feature of the present invention is a mobile machine which may move continuously along the bed of a railroad track and has base runners to bear down upon the tops of the ties while the rails are guided through and over the top of such runners, thereby lifting the rails off the ties and pulling the spikes out of the ties and allowing the tie plates to drop free and be separated from the rails. The base runners apply downward thrust onto the ties as to seat the ties in the grapple bed of the railroad again.

The rails passing over the runners remain in upright position and are guided by rollers on the runners and are supported on an inclined steel deck of a reciprocating carriage or slide supported on the base runners or frame of the machine.

The slide has a superstructure on the inclined deck defining tunnels or guideways for the two rails being lifted from the track which guide the rails past clamping jaws, past an upright stationary fulcrum or anvil at the outer side of the rail, a breaking shoe adjacent the anvil but at the inner side of the rail, and a sensor or feeler to sense a length of the rail which has passed the breaking shoe. The clamping jaws are operated by a hydraulic cylinder; the breaking shoe adjacent each rail are operated by a hydraulic cylinder. The sensor or feeler which engages the ends of the rails actuate a control circuit to commence a cycle of operation of the clamp and breaker.

The clamping jaws are operated first in the cycle to grip the sides of the rails and hold the carriage or slide stationary with respect to the rails while the base runners continue to progress along the bed of the track. After the clamping jaws grip the rails, the breaker shoes are operated to bear against the inner sides of the rails, preferably against the side of the upright web of the rail and against the top head of the rail and also against the base flange. The outward pressure against the side of the rail causes the rail to break off rather cleanly at the edge of the anvil.

Each of the clamping jaws also carries a hardened sharpened blade opposite the anvil, to bear against and nick the inner side of the head and base flange of the rail to a depth of approximately one-fourth inch to locate the break and improve the quality of the break transversely across the rail. The edge of the blade protrudes toward the rail from the clamping face of the clamping jaw by approximately one and one-half inches. As breaking pressure is applied against the rail, the blade moves deeper into the rail to promote the breaking. Although the nicks in the side of the rails might be otherwise formed, as by a saw, the use of a blade on the clamping jaw has proved quite satisfactory.

As the breaker shoes protrude outwardly against the rails and the breaking of the rails is completed, the extended position of the breaker shoes is sensed by electric switches which operate a hydraulic valve, first withdrawing the breaker shoes, then simultaneously releasing the clamping jaws from the rails and causing a hydraulic ram to draw the slide or carriage forwardly again and along the rails being lifted from the track bed, until the carriage or slide reaches its home or forward position. When the movement of the machine along the track bed has progressed sufficiently to cause the new broken ends of the rails to engage the feelers or sensors on the slide, another cycle of operation is commenced.

The mobile machine is drawn along the track bed by a tractor. The mobile machine may use the runners to entirely support the remainder of the machine; or the machine may be supported on wheels with the runners elevated slightly for stripping the ties from the rails, but without fully supporting the machine. The rear of the machine may also be supported on rear wheels and such rear wheels may be clustered into a truck supporting the rear of the frame and adapted to be steered to accommodate transport of the machine along a highway and behind a towing vehicle.

The slide or carriage may also be mounted in a stationary installation, such as in a scrap yard, and with the rails being transported longitudinally into the guiding tunnels and past the breaking shoes as by a chain conveyor or belt conveyor or similar conveying apparatus.

The invention provides numerous advantages in lifting the rails from the bed of a railroad track. Firstly, the rails may be lifted and formed into short pieces, convenient for handling, so that relatively small equipment may be used for subsequent handling of the rails. The short lengths, three to four feet, of rails are easily discharged off to the side of the track bed, and subsequent clean up operations by a small tractor with a grapple or a crane with a magnet, can pile the short lengths of track into small piles or immediately load them onto trucks for transport. The tie plates are stripped off the rails and off the wooden ties and may be easily picked up with magnets for loading into trucks.

It has been found that the rails may be easily removed from approximately two miles of track each day with the use of the present invention. Rails of varying sizes may be accommodated in the machine. The nicking of the sides of the head and base flange of the rails assures that the rails will break rather cleanly at the anvil under the influence of the pressure of the breaking shoe moving against the inside of the rail. The anvil or fulcrum has a replaceable insert or block defining the corner over which the rail is broken, and accordingly, by using blocks of various thicknesses, the location of the fulcrum corner, relative to the breaking shoe, is subject to considerable adjustment, which is valuable in breaking rails of varying sizes. It has been found that the connector bars which connect the ends of adjacent rails together, will pass through this machine without difficulty and may also be broken, along with the rails.

DETAILED SPECIFICATION

The machine 10 of FIGS. 1–8 accomplishes the principal functions of lifting the railroad track rails 11 and 12 from the roadbed 13 which in most cases is formed of crushed rock or gravel, separating the rails 11 and 12 from the wooden ties 14; allowing the tie plates 15 to fall free as the rails are separated from the ties by pulling the spikes 16 and breaking the rails 11 and 12 into short lengths 11.1 and 12.1, which become entirely free of the tracks 11 and 12 and are allowed to lay along the sides of the roadbed to be subsequently picked up and hauled away by other equipment.

The machine 10 has a frame 17 which includes a pair of elongate runners 18 and 19, rigid cross framing and bracing 20 which rigidly interconnects the runners 18 and 19 together, an elevated supported structure 21 for supporting an engine confined within the housing 22 for driving pumps 23 (see FIG. 7), a swingable drawbar structure 24 for attaching the frame to a tractor 25 which pulls the machine 10 along the track bed. The frame 17 also includes a pair of inclined ramps 26 formed of I-beams, and respectively mounted at the outer sides of the runners 18 and 19 and adjustably supported on removable bolts or pins 27 and upright brackets 27.1 to accommodate adjusting the slope of the ramps 26.

At the front ends of the runners 18 and 19, the lower edges thereof are curved forwardly and upwardly to form tie stripping and hold-down shoes 28. The runners 18, 19 also have auxiliary hold-down shoes 29, adjacent their inner sides, the lower edges 30 of which bear downwardly on the ties and tie plates to hold the ties down in the same fashion as hold-down shoes 28. The auxiliary hold-down shoes 29 are affixed to the runners 18, 19 by framing plates 31 welded therebetween. The space 32 between the runners 18, 19 and their adjacent hold-down shoes 29 is open and unobstructed to permit the rails 11, 12 to extend and pass longitudinally therethrough.

The spaces 32 are traversed by rollers 33 which underlie and support the rails 11, 12 being lifted off the roadbed 13. Rollers 33 are mounted in bearings 34 carried on the runners 18, 19 and hold-down shoes 29. Guide plates 35 extend between the front ends of the runners 18, 19 and their adjacent hold-down shoes 29. Each of the guide plates 35 has a notch or recess 35.1 in its lower edge and receiving the top of the rail therethrough. The plates 35 hold the rails down to maintain a predetermined relation of the rails to the runners 19 and rollers 33.

It will be seen that as the tractor 25 tows the machine 10 along the railroad track bed 13, the runners 18, 19 pass over the tops of the ties 14, and at the outsides of the tracks 11, 12. The hold-down shoes 29 move along the insides of the tracks 11, 12, which are carried over the rollers 33. The lower edges 28, 30 of the runners and hold-down shoes bear downwardly against the ties 14 and the tie plates 15 thereon and strip the ties from the rails which are being lifted upwardly at a slight angle. The tie plates 15 will fall free, and the ties 14, after being initially lifted immediately behind the tractor, are returned downwardly by the runners and hold-down shoes into the same spaces in the rail bed from which the ties were lifted. By pulling the frame 17 and runners 18, 19 along the rail bed, the rails 11, 12 are progressively fed upwardly and rearwardly, into and through the slide or carriage 36 and to the work stations 37 thereon at which the rails are broken into easily manageable lengths, such as three to four feet.

The slide 36 has a base plate 38 which extends along and overlies the ramps 26. The base plate 38 is slideably supported on the top flanges of the I-beams ramps 26 by a multiplicity of guides 39 which are welded to the bottom of the base plate 38 and which slideably receive the top flanges of the I-beams ramps therethrough. Accordingly, the slide 36 is free to slide forwardly and rearwardly along the inclined ramps 26 as indicated by arrows 40.

A hydraulic cylinder or ram 41 extends longitudinally of the frame 17, and has its cylinder end 41.1 anchored to the frame, and has its piston rod end secured as by pin 41.2 to a bracket welded to the bottom of the base plate 38 for drawing the slide forwardly and returning it to its forward or rest position at the end of a rail breaking cycle during which the slide 36 has relative rearward movement along the ramps 26 during the breaking operation.

Figure 5:
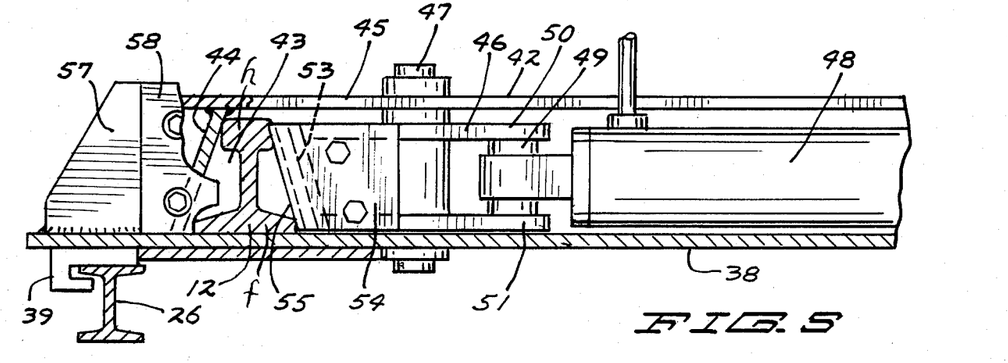
FIG. 5 is an enlarged detail section view taken approximately at 5—5 of FIG. 3.
Figure 6:
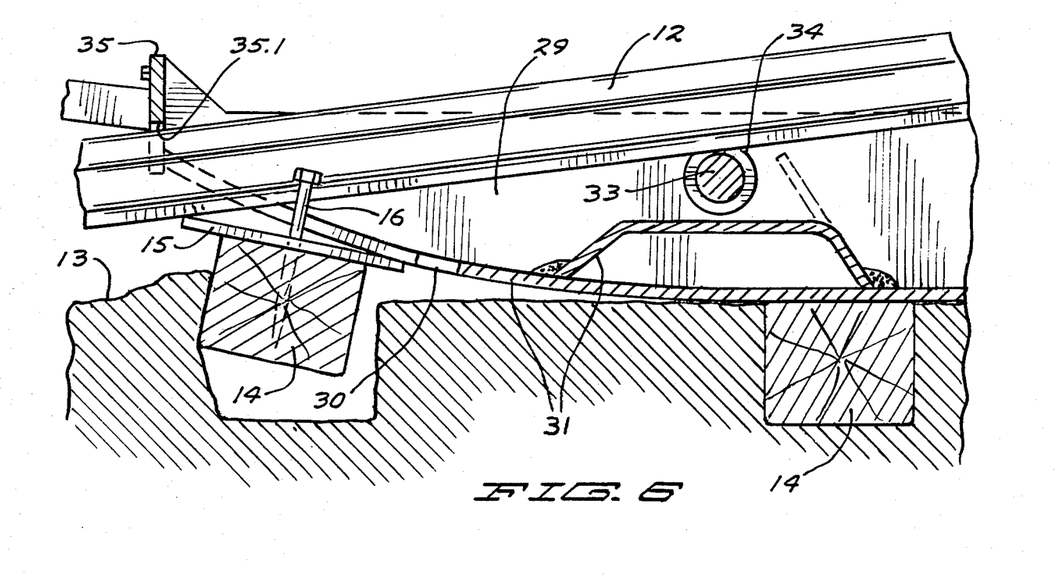
FIG. 6 is an enlarged detail section view taken approximately at 6—6 in FIG. 2.

The slide 36 has a superstructure 42 defining guideways 43 receiving the rails 11, 12 in upright position. The superstructure 42 of the slide includes upright but inclined guide plates 44 welded to the top surface of the base plate 38 and supporting the rigid top plate or panel 45 which traverses substantially the entire width of the base plate 38 and both of the guideways 43. The top plate is also supported by additional upright webs or frame plates 45.1. The guideways 43 are shaped to maintain the predetermined orientation between the rails 11, 12 and the superstructure on the slide. Accordingly, as seen in FIG. 5, it will be noted that the guide plates 44 at the outer sides of the rails 11, 12 are inclined as to bear against and guide both the base flange and head or ball of the rail.

The inner sides of the guideways are defined by swingable clamps or clamp jaws 46 which extend longitudinally along the guideways 43 and between the bottom plate 38 and top plate 45. The clamps 46 are swingably mounted on hinge pins 47. The two clamps 46 are interconnected and operated by a hydraulic cylinder 48, the cylinder and piston rod ends of which are respectively connected to the two clamps 46 by pins 49. Accordingly, when the piston rod is extended, both clamps 46 operate simultaneously against the respective rails 11, 12, and when the clamp cylinder 48 is retracted, both clamps are retracted simultaneously.

The clamps 46 are fabricated of steel plates and have top and bottom plates 50 and 51, and end plates 52. The clamping jaw faces of the clamps 46 are defined by clamp jaw plates 53 which are inclined as seen in FIG. 5 as to simultaneously bear against and clamp both the head of the rail and the base flange thereof to maintain the desired orientation between the slide and the rails 11, 12. The ends of the clamps 46 adjacent the hinge pins 47 diverge away from the guideways 43 as to guide the rails 11, 12 into the guideways for proper orientation with respect to the slide and work stations 37.

A blade 54 with a sharpened edge is affixed to each of the clamps 46 to provide means for notching the sides of the rails 11, 12 at both of their heads and base flanges. The blades 54 lie across the ends of the clamps and are secured by mounting screws to the end plates 52 of the clamps. The sharpened edges 55 of the notching blades 54 extend beyond the adjacent clamping faces of the clamp jaws 46 by a distance of one to one and one-half inches as to produce notches in the sides of the rail head and base flange. Initially the notches may be approximately one-fourth of an inch in depth. The notching blades 54 also form a portion of the clamp 46 and assist materially in retaining the stationary relation between the rails and the slides. It will be seen in FIG. 5 that the sharpened edge 55 of the blade 54 has an inclined orientation, approximately the same as that of the clamp jaw plate 53 for notching both the head of the rail and the base flange of the rail simultaneously.

Although it is recognized that other devices, such as a saw, may be used for notching the side of the rail, it has been found that the notching blades 54 operate quite satisfactorily and actually serve to deepen the notches in the rails and promote breaking, as breaking pressure is applied, as hereinafter described.

The slide 36 is also provided with a pair of anvils or fulcrums 56 located directly opposite the ends of the clamps 46 and the notching blades 54. The anvils comprise rigid steel blocks 57 affixed as by welding to the base plates 38 of the slide and formed to define mounting seats 57.1 for hardened steel insert blocks 58 affixed as by mounting bolts to the anvil blocks 57. It will be recognized that the anvils 56 confront the outer sides of the rails 11, 12 and define hardened corners 58.1 over which the rails 11, 12 are broken. Both of the anvil blocks 57 and the hardened anvil inserts 58 are notched or recessed at 59 to receive the edge portion of the base flange of the adjacent rail, in order to maintain the desired orientation of the rail and the slide and breaking apparatus hereinafter described. As particularly seen in FIG. 3, the seats or recesses 57.1 in the anvil blocks 57 will accommodate hardened inserts 58 of various thicknesses. The hardened inserts 58 shown in full lines in FIG. 3 occupy only half of the width or depth of the seat 57.1, but an alternate hardened steel insert with a substantially greater thickness, as indicated by the dotted line 58.2 in FIG. 3 may be substituted as to relocate the position of the corner 58.1 over which the adjacent rail will be broken. The particular location of the corner 58.1 of the anvil over which the rail is to be broken, is especially important in using the machine 10 with rails of different sizes and weights. Heavier or larger rails will usually use an insert block substantially the size illustrated in FIG. 3; and for rails of somewhat smaller dimension and lighter weight, an insert block with a width substantially as indicated by the dotted line 58.2 will more likely be used as to shift the location of the corner 58.1 over which the rail is to be broken.

Immediately adjacent the anvils 56, there remains open and unobstructed spaces 60. The spaces 60 accommodate the movement of the short lengths 11.1, 12.1 of the rails during the breaking operation.

The work station 37 at each side of the slide 36 is directly opposite the open and unobstructed space 60 and also adjacent the anvil 56. At each of the work stations 37, a rail breaking pressure shoe 61 is located adjacent the inner side of the adjacent rail for movement outwardly against the side of the rail for breaking the rail over the adjacent anvil 56. Hydraulic cylinders 62 and 63 are respectively connected with the two breaker shoes 61 for applying pressure to the rails for breaking. Each of the cylinders 63 is solidly mounted against a rigid frame plate 64, and the two cylinders 62 are arranged in back to back relation to each other to derive strength from each other during application of pressure. The upright frame plate 64 is welded to the base plate 38 and to other adjacent upright frame plates 65.

Figure 4:
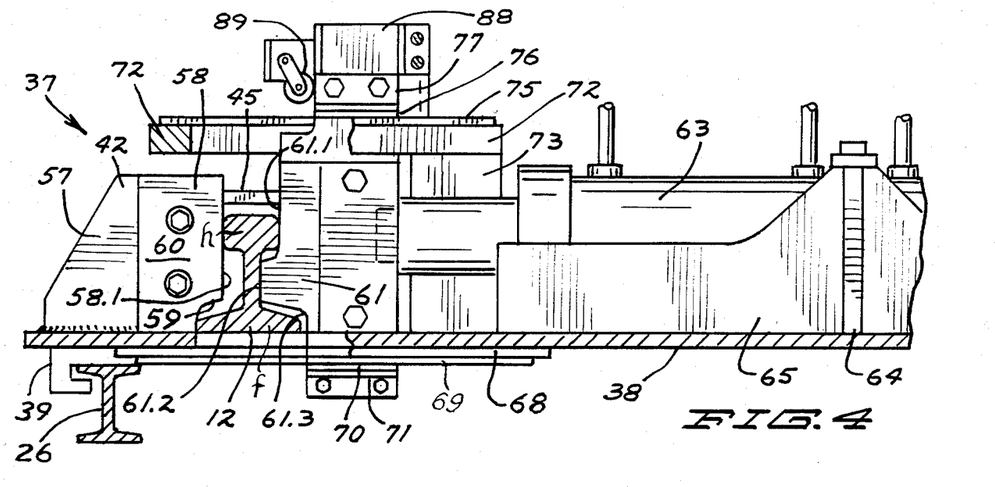
FIG. 4 is an enlarged detail section view taken approximately at 4—4 of FIG. 3.
Figure 7:
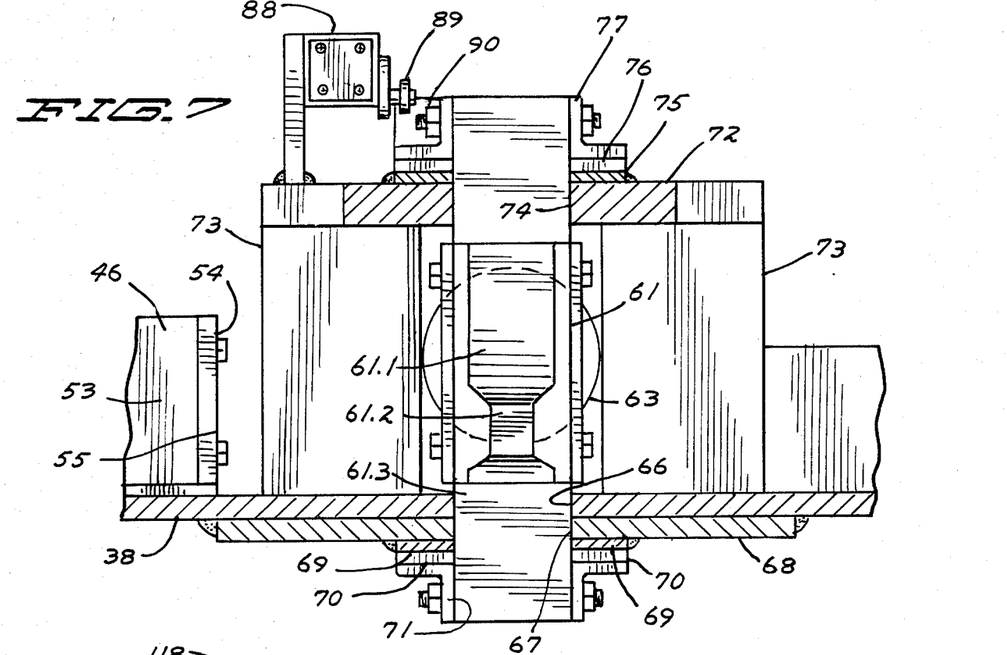
FIG. 7 is an enlarged detail section view taken approximately at 7—7 of FIG. 3.

The pressure face of one of the breaker shoes 61 is seen in elevation in FIG. 7 and in profile in FIG. 4. The pressure face of the breaker shoe 61 is configured to engage the rail at three locations simultaneously and without tending to cause any twisting or tipping of the rail. The breaker shoe 61 has an upper face portion 61.1 to bear against the head of the rail, a projection or snout 61.2 for engaging the upright web of the rail, and a lower face portion 61.3 below the snout to engage the edge of the base flange of the rail.

It will be seen in FIG. 4 that the breaker shoe is connected with the extendable piston of the adjacent cylinder. The breaker shoe 61 comprises a solid block of hardened steel and extends downwardly through a slot 66 in the base plate 38 and through a slot 67 of equal size formed in a reinforcing plate 68 attached as by welding to the bottom side of the base plate 38. A pair of steel strips 69 lie along the slot 67 and 66 to guide the movable slide bar 70 attached by angle irons 71 to the side of the pressure shoe 61. The upper portion of the pressure shoe 61 is guided and supported by an overhead guide frame 72 mounted on reinforcing frame structure 73 welded to the base plate 38, and slotted at 74 to receive the upper portion of the pressure shoe therein. Replaceable wear and guide plates 75 on the guide frame 72 slideably mount the wear strip 76 carried by the angle clip 77 on the upper portion of the pressure shoe 61.

Figure 1:
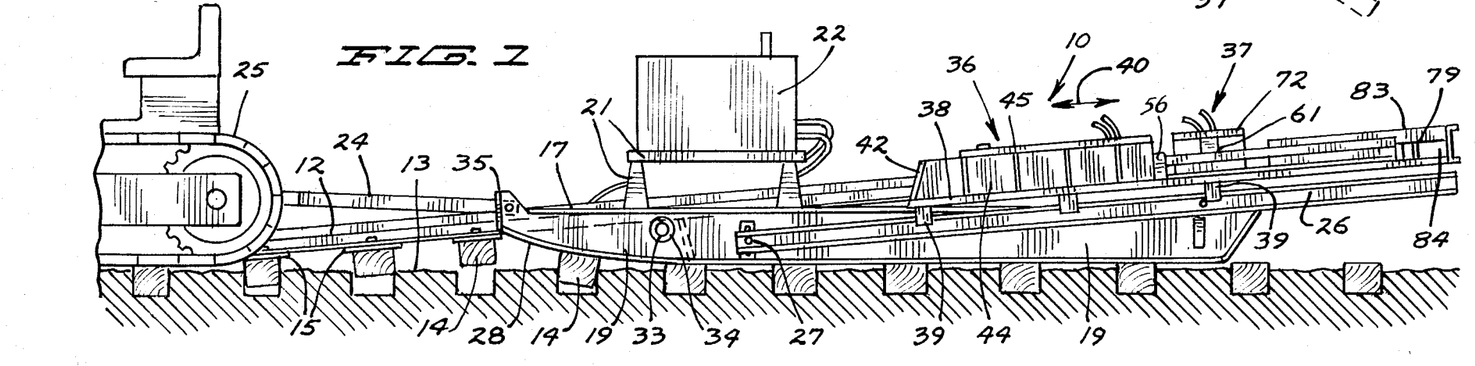
FIG. 1 is an elevation view of the track lifting and breaking machine.
Figure 2:
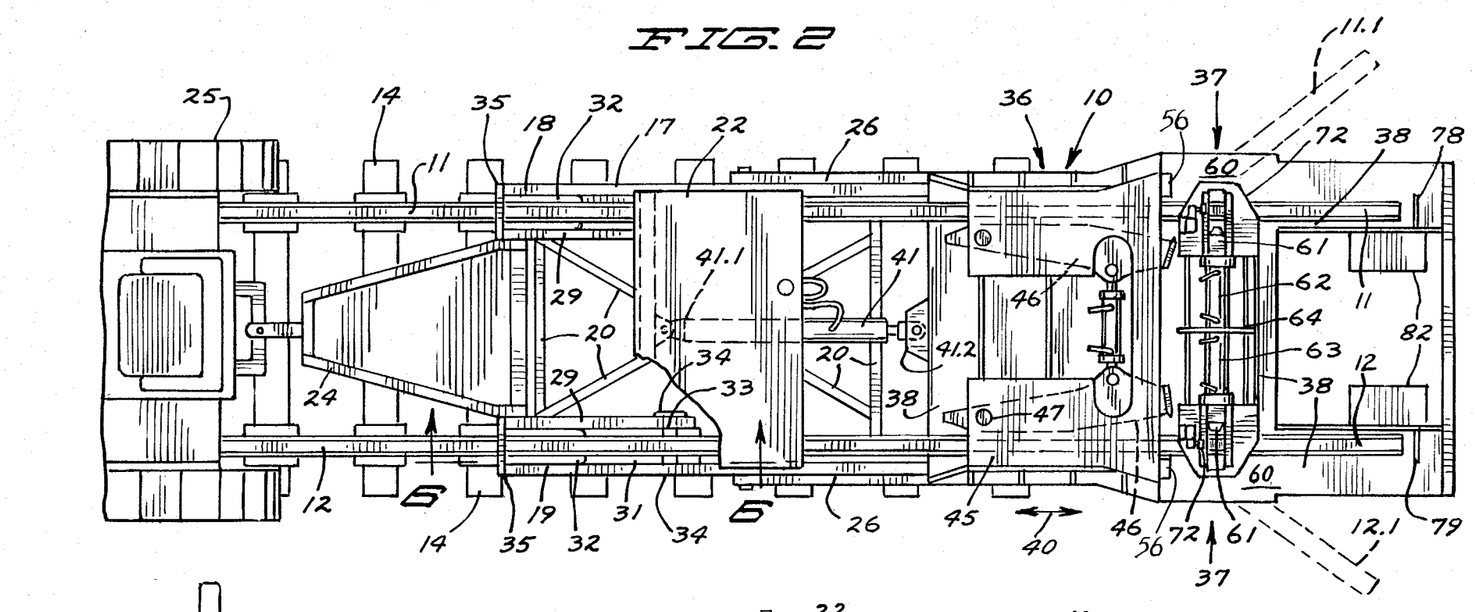
FIG. 2 is a top plan view thereof.

As seen in FIGS. 1 and 2, the base plate 38 of the slide 36 extends rearwardly from the work stations 37 by a distance in excess of the lengths of rail which are to be broken from rails 11 and 12. Feelers 78 and 79 are located in interferring relation with the path of the rails 11, 12 as they move rearwardly over the deck of the slide 36 for sensing the presence of such rails. The feelers 79 are located to operate sensing switches 80 and 81, respectively, so as to commence a cycle of operation of the breaker. The feelers 78 and 79 are mounted on subframes 82, behind upright guide walls 83. The feelers 78 and 79 extend through openings 84 in the walls 83 into the path of the rails moving over the deck of the slide. The feelers are swingably mounted on pivots 84 and bear against the operating arms 85 of the switches 80 and 81 as to operate the switches when the feelers are engaged and swung by the end of the moving rail. Return springs 86 are connected with the feeler arms 78 and 79 for returning these feelers arms to their normal position. The feelers 78 and 79 are made of strips of steel to be rugged and resistant to damage.

Additional control switches 87 and 88 are mounted at the work stations adjacent rails 11 and 12 respectively. The switches 87 and 88 are similarly mounted to sense the completion of the outward movement of the breaker shoes 61 when the rails have been successfully broken. The operating arms of switches 87 and 88 carry rollers 89 to sense the location of operating tabs 90 on the angle clips 77 moving with the pressure shoes 61.

Figure 8:
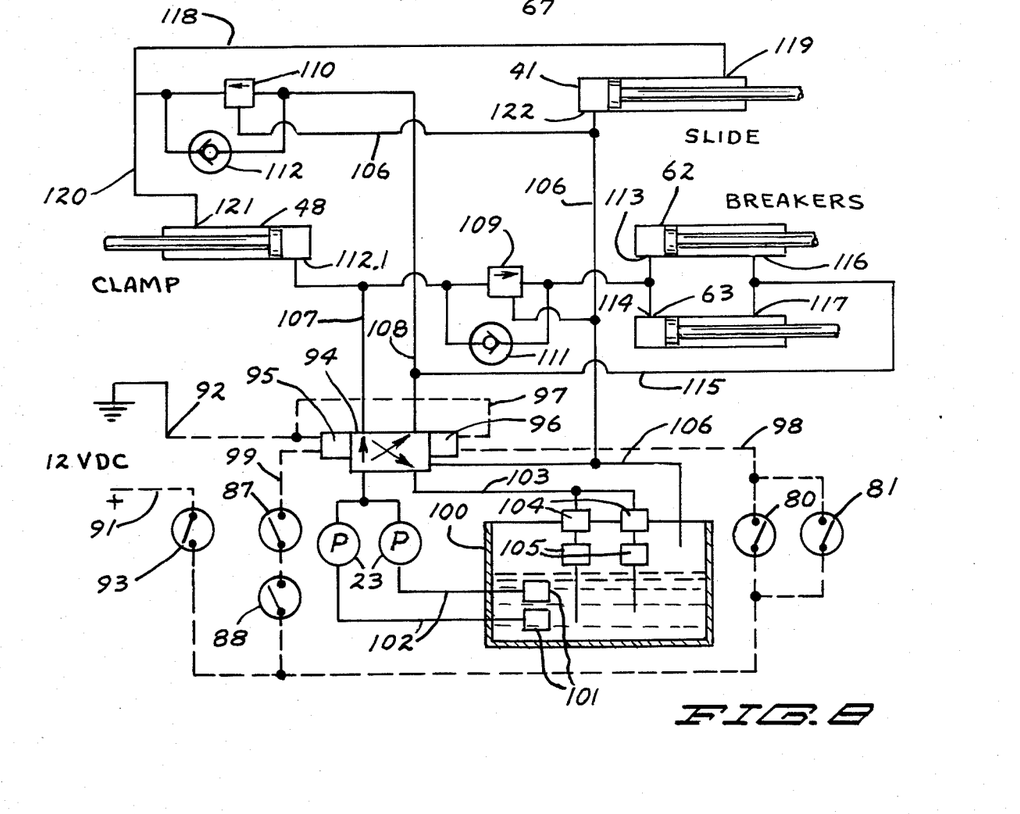
FIG. 8 is a schematic diagram of the electrical and hydraulic circuits in the machine.

The hydraulic and electrical schematic circuit of FIG. 8 is helpful in understanding the operation of the rail breaking machine. The electrical conductors are shown in dashed lines; the hydraulic lines are shown in full lines. A source of 12 volt DC current is supplied to terminals 91, 92, and a master control switch 93 is connected directly to the terminal 91. A solenoid operated reversing valve 94 has separate solenoids 95 and 96 to reverse the positions of the valve 94. Both of the solenoids 95 and 96 are connected to the ground terminal 92 by the conductor 97. Solenoid 96 which operates the valve 94 to commence an operating cycle is connected by conductor 98 and the parallel connected switches 80, 81 to the master control switch 93; and the solenoid 96 will commence a cycle of operation whenever either of the switches 80 or 81 is closed temporarily. The solenoid 95 is connected by conductor 99 through the series connected limit switches 87 and 88 to the main power switch 93; the solenoid 95 will thereby operate whenever both of the limit switches 87 and 88 have been closed simultaneously.

In the hydraulic circuit for the rail breaker, the pumps 23 are driven by the engine in the housing 22 to develop high pressure in the hydraulic fluid system for operating the clamp cylinder 48, breaking cylinders 62 and 63, and the slide cylinder 41. The pumps 23 draw hydraulic fluid from the reservoir tank 100 and through suction filters 101 and intake lines 102. The high pressure or output side of the pumps are connected to the high pressure side of the valve 94. Pumps 23 develop pressures up to 3000 psi which is needed to operate the breaker cylinders 62, 63. The return port of valve 94 is connected to a return line 103 which directs the returning hydraulic fluid through coolers 104 and filters 105 and into the reservoir tank 100. A drain line 106 also returns into the reservoir tank, above the fluid level.

The controlled pressure lines 107 and 108 from the controlled ports of valve 94 are respectively connected with pressure responsive sequencing valves 109 and 110 respectively. The valves 109 and 110 are responsive to the level of pressure applied to them and will open to allow hydraulic fluid to flow through when a high pressure of approximately 3000 psi is sensed.

It will be recognized that each of the sequencing valves 109, 110 has a bypass check valve 111, 112, respectively, freely allowing flow in a reverse direction past the valve. Each of the sequencing valves 109, 110 is also connected to the drain line 106.

The pressure line 107 is connected directly to the extending port 112.1 of the clamp cylinder 48; the pressure line 107 is also connected through the sequencing valve 109 to the extending ports 113 and 114 of breaker cylinders 62 and 63 respectively.

Pressure line 108 is connected by pressure line 115 to the retracting ports 116 and 117 of breaker cylinders 62 and 63, respectively. The pressure line 108 is also connected, through the sequencing valve 110, to pressure line 118, which connects to the retracting port 119 of slide cylinder 41; and also through pressure line 120 to the retracting port 121 of clamp cylinder 48. The drain line 106 is also connected to extension port 122 of the slide cylinder 41 to carry away leakage of fluid, but without ever applying fluid pressure to the extension port 122.

In operation, the pumps 23 are operated continuously by the engine, but have built-in bypasses for use when hydraulic fluid is not being pumped. In the rest mode of the machine, the breaker cylinders 62 and 63 will have been retracted so that the breaker shoes 61 are out of the way at the side of the path of travel of the rails 11, 12. The slide cylinder 41 will have been retracted and the slide 36 will be in its rest position adjacent the forward end of the machine. In rest mode, the clamp cylinder 48 will have been retracted so that clamps 46 are away from the rails 11, 12. Main power switch 93 is closed and remains closed during normal operation. The tractor 25 progressively moves along the track bed, over the ties, and draws the machine 10 with it. The runners 18, 19 move along over the ties, as illustrated, in a forward direction; and the rails 11, 12 are directed upwardly over the rollers 33 and above the deck plate 38 of the slide 36 and through the guideways 43. The holddown shoes at the front of the runners 18, 19, together with the hold-down shoes 29 at the inner sides of the rail, hold down the ties 14 as the rail is lifted slightly upwardly and passed over the rollers 33. The holddown shoes bear downwardly onto the ties as the runners progressively move forwardly as to strip the ties downwardly away from the uplifted rails 11, 12.

As the machine 10 moves forwardly along the track bed with the tractor, the whole machine and tractor may move continuously without stopping, and short lengths 11.1 and 12.1 of the rails will be periodically broken off and dropped off to the side of the rail bed. When the machine has been drawn sufficiently far along in a forward direction on the track bed 13, the end of one of rails 11, 12 will engage its respective feeler 78 or 79 as to operate one of the switches 80, 81. When one of these switches has been closed, the solenoid 96 operates to operate the valve 94 so as to apply high pressure hydraulic fluid to the pressure line 107 and simultaneously connect the pressure line 108 to the return line 103 and to the reservoir tank 100.

Application of high pressure to the pressure line 107 immediately causes application of pressure to the extension port 112 of clamp cylinder 48, which are approximately six inches in diameter, and the clamp cylinder is extended. During preliminary movement of the clamp cylinder 48, pressure in the line 107 will not build up to maximum pressure, and therefore, the sequencing valve 109 remains closed, temporarily.

When the clamp cylinder extends substantially fully, the clamps 46 move outwardly and bear against and clamp to the inner sides of rails 11, 12, causing the outer sides of the rails 11, 12 to bear firmly against the stationary plates 44 at the side of the guideways 43. Also, as the clamps 46 move outwardly against the rails 11, 12, the sharp edged blades 54 will first bear and apply great pressure against the sides of the rails, producing nicks or notches in the sides of the heads h and in the edge of the base flanges f to a depth of approximately one-fourth inch in the sides of the rails directly opposite the anvils 56. Initially, the faces of the clamp plates 53 remain spaced from the rail.

Operating the clamps 46 causes the slide 36 to be clamped to the rails 11, 12; and the continued movement of the runners 18, 19 along the track bed will cause relative sliding movement of the slide 36 rearwardly along the ramps 26. Immediately after the clamp cylinder 48 has extended to its fullest extent, the fluid pressure in pressure line 107 is increased by operation of the high pressure pumps 23 so as to cause the sequencing valve 109 to open and allow hydraulic fluid to flow into the extension ports 113, 114 of breaker cylinders 62, 63, whereupon the breaker cylinders 62, 63 commence to extend their piston rods. Extension of the breaker cylinders 62, 63, which are approximately six inches in diameter, causes the breaker shoes 61 to commence movement outwardly and to bear firmly, applying great pressure against the inner sides of the rails, substantially in the manner illustrated in FIG. 4. Because the breaker shoes 61 are located in spaced relation, along the rails, from the anvils 56, the application of significant pressure by the pressure shoes 61 causes the rails to break over the anvils 56 and especially at the corners 58.1 of the hardened inserts 58. The nicks produced in the sides of the rails, by operation of the sharpened blades 54, assure that the breaks in the rails will occur at the desired locations, which is at the corners of the anvil inserts 58. The lengths of rails between the anvils 56 and the feelers 78, 79 are immediately broken off as is indicated in dotted lines 11.1 and 12.1 in FIGS. 2 and 3. It has been found that the rails 11, 12 will break with a fairly regular shape at the point of breaking.

As the breaker shoe 61 applies great pressure against the side of the rail, the rail will bow in the vicinity of the clamp jaw 46 and against the face of the clamp plate 53; and simultaneously, the blade 54 will move further into the head and base flange of the rail, until the adjacent portions of the clamp plate bear against the rail. The continued pressure applied by the breaker shoe 61 completes the breaking of the rail.

It has been experienced that rails will readily break without the nicks produced by the sharpened blades 54; however, by nicking or notching the rails with the sharpened blade 54, and producing a notch in the side of the head of the rail and in the base flange of the rail, the rails will regularly and consistently break, regardless of temperature conditions, variances in dimensions, and other variables that are experienced in the field.

Figure 3:
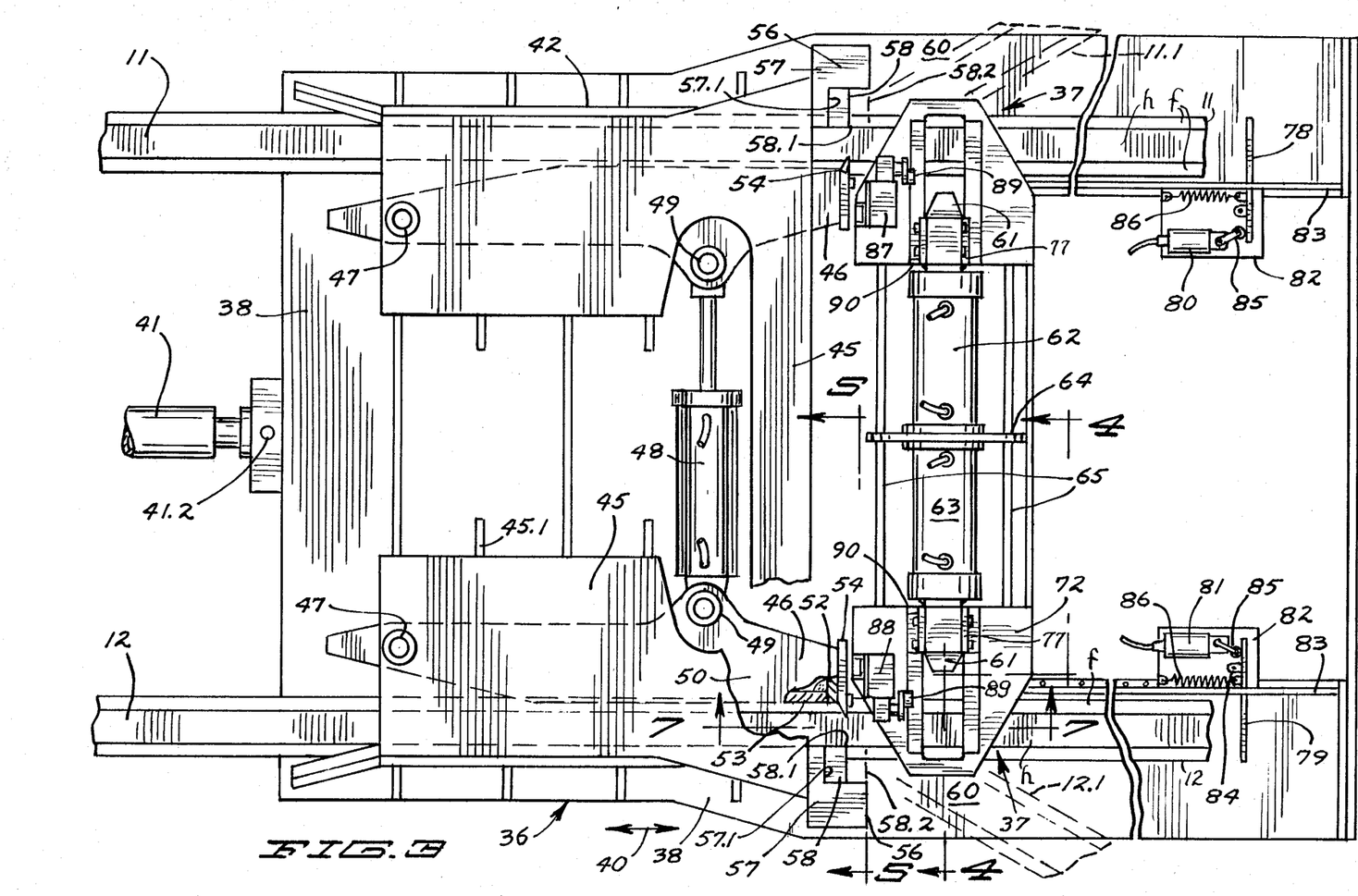
FIG. 3 is a greatly enlarged detail plan view of a portion of the machine.

It has also been experienced that in the event that the rails 11, 12 are of somewhat lighter weight and smaller dimensions, it may be desirable to increase the thickness of the hardened steel inserts 58 so that the side of the insert extends to the dotted line 58.2 as seen in FIG. 3, thereby moving the corners 58.1 of the anvil closer to the breaker shoes 61. In this condition, the smaller and lighter rails will be readily broken.

As the breaker cylinders 62, 63 extend, the pressure shoe 61 is supported on the guiding frame 72 and on the stationary wear plates 75 by the moving slide strips 76 secured to the top clips 77. The upper portion 61.1 of the face of the pressure shoe will bear against the side of the head of the rail; simultaneously the snout 61.2 will bear against the upright web of the rail; and the lower face portion 61.3 of the pressure shoe will bear against the base flange of the rail.

As pressure is increasingly applied by the pressure shoe, the rail bears heavily against the hardened insert 58 of the anvil and will break around the corner of the insert. As the rails break, the short lengths 11.1, 12.1 move out into the unobstructed space 60, under the influence of the breaker shoe 61 and drop onto the side of the roadbed, free of the track and free of the machine.

When the short sections 11.1 and 12.1 of rails have been broken off and swung to the outward position as illustrated in FIGS. 2 and 3, the feelers 78, 79 are swung back into their normal position so as reopen the switches 80, 81, as to deenergize solenoid 96.

When the breaker shoes 61 have moved outwardly to their fullest extent by complete extension of the cylinders 62, 63, the short lengths 11.1, 12.1 of rails will have broken off, and the two limit switches 87, 88 will both be closed. When the limit switches 87, 88 have both been closed, the solenoid 95 will operate the valve 94 to reverse the connections of it. Pressure line 107 is now connected to the return line 103; and pressure line 108 is now connected to the pumps 23.

When the valve 94 reverses its internal connections after sensing that operation of both breaker shoes has been completed, the pressure line 108 immediately applies high pressure hydraulic fluid to the retraction ports 116, 117 of the breaker cylinders 62, 63 and the cylinders 62, 63 will draw the breaker shoes 61 inwardly; and simultaneously ports 113, 114 of the breaker cylinders 62, 63 are connected through check valve 111 to the return line 107, 103. When the breaker cylinders 62, 63 have fully retracted, the hydraulic fluid pressure in pressure line 108 is built up by pumps 23 until the sequencing valve 110 operates to open, whereupon the high hydraulic fluid pressure is applied to the high pressure lines 118, 120. When the fluid pressure is applied to line 120, and to the retraction port 121 of the clamp cylinder 48, the clamps 46 are immediately swung inwardly, away from the rails 11, 12 whereupon the slide 36 is free of the rails 11, 12 and free to move along the ramps 26. Simultaneously with releasing the clamps 46, the high fluid pressure is applied to the retraction port 119 of slide cylinder 41 whereupon the slide cylinder retracts its piston rod and moves the slide 36 forwardly along the ramps 26 until the slide cylinder 41 is fully retracted, whereupon the slide stops.

As the slide 36 is moving forwardly, the tractor 25 continues to propel the entire machine 10 forwardly along the track bed, and the rails 11, 12 are moving rearwardly with respect to the frame of the machine 10. The combined relative movement between the slide 36 and the rails 11, 12 due to the forward movement of the slide 36 along the ramps 26, and due to the continued forward motion of the runners 18, 19 along the track bed, causes the rear ends of the broken rails to again approach the feelers 78, 79.

As previously explained, whenever the end of one of the rails engages and moves a feeler 78, 79, it operates one of the switches 80, 81, a new cycle of breaking operation is commenced. The clamps 46 will immediately grip the rail to commence movement of the slide 36 along the ramps 26; and the breaker shoes will move outwardly against the sides of the rails to break off short lengths of the rails again.

Figure 9:
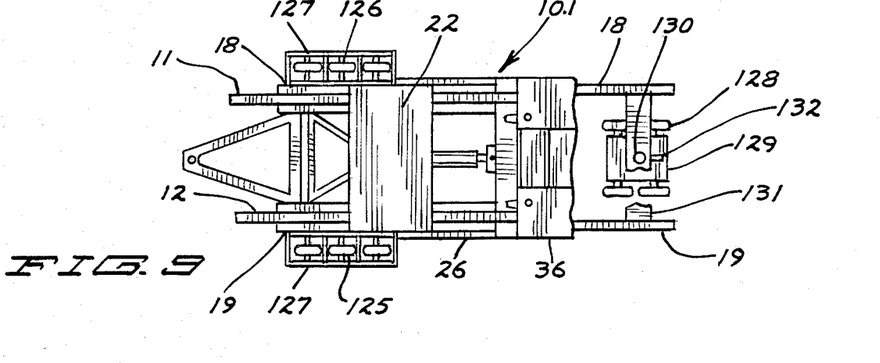
FIG. 9 is a top plan view, partly broken away for clarity of detail, illustrating a modified form of the invention.
Figure 10:
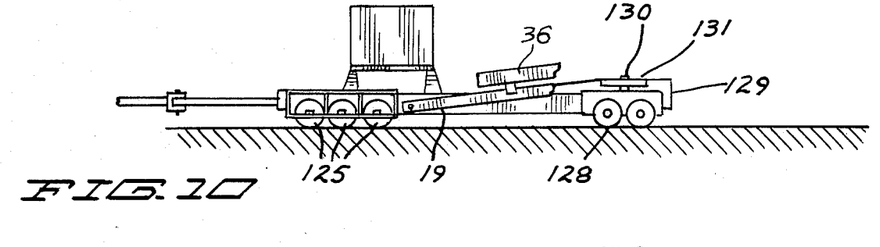
FIG. 10 is a side elevation view, partly broken away for clarity of detail, and illustrating the form of the invention of FIG. 9.

In the form of the invention illustrated in FIGS. 9 and 10, the rail lifting and breaking machine 10.1 is substantially identical to that illustrated in FIGS. 1-8. The machine has the identical runners 18, 19, slide 36 moving along ramps 26 and all of the mechanism illustrated in FIGS. 2 and 3 for clamping the slide to the rails and breaking the rails, as described. In this form of the invention, the machine 10.1 has a plurality of support wheels 125, 126 at the front end of the machine and at opposite sides and to roll along the track bed, over the ties, and to support the front ends of the runners 18, 19 several inches above the top of the roadbed. The runners 18, 19 continue to serve to strip the rails off the ties, but the weight of the machine is supported on the wheels 125, 126. The wheels 125, 126 are mounted in wheel frames 127 affixed to the main frame 17 and particularly the runners 18, 19.

At the rear of the machine, rear support wheels 128 are mounted on a truck 129 which is secured by a pivot 130 mounted in a cross frame 131 affixed to the runners 18, 19. The orientation of the wheeled truck 129 is established by a pin 132 so that the rear of the machine follows along the track bed but with the rear ends of the runners 18, 19 elevated slightly above the track bed. With this wheeled construction, substantially less energy and power is expended for producing the forward motion of the rail lifting and breaking machine; and the wheels are useful in transporting the machine from one job site to another. The indexing pin 132 may be removed, and a tongue may be attached to the truck 129 which may be drawn by a truck or other vehicle. Turning of the truck allows steering of the machine during towing, and the machine may be easily transported from one job site to another.

Figure 11:
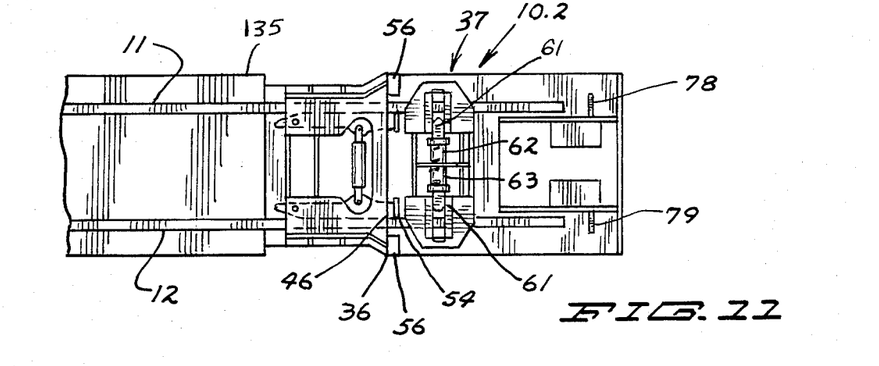
FIG. 11 is a top plan view of a second modified form.
Figure 12:
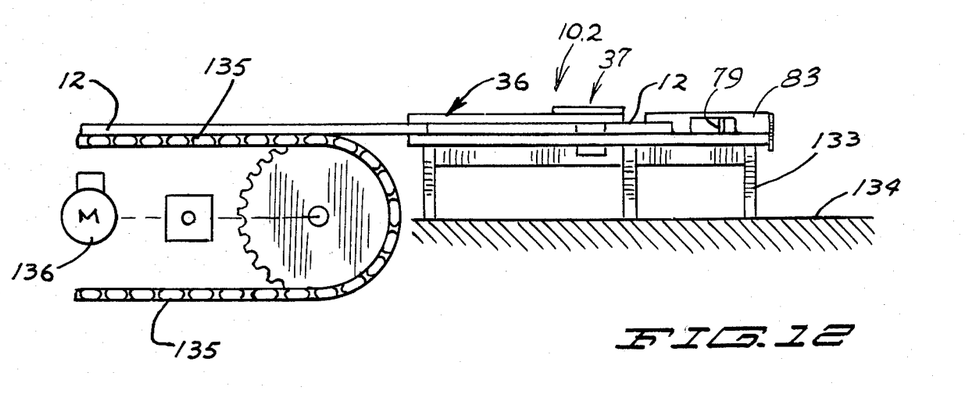
FIG. 12 is a side elevation view of a second modified form.

The form of machine 10.2 illustrated in FIGS. 11 and 12 utilizes the slide 36, identical to the slide 36 of FIGS. 1-8, but stationary and supported on brackets 133 from a suitable support or footing 134 in a stationary installation. The slide 36, being stationary, now becomes the frame of the machine for the clamps 46, the notching blades 54, the breaker shoes 61, and their cylinders 62, 63 and feelers 78, 79. Rails 11, 12, or one such rail, are supplied to the breaking apparatus by a motor operated chain conveyor 135. In this installation, whenever the end of a rail is felt by one of the feelers 78, 79, the motor 136 of the chain conveyor is stopped as to stop the conveyor, allowing the notching blades to engage and clamp the rails and produce the notches in them and permitting the breaker shoes to break the rails over the anvils 56. In this form of FIGS. 11, 12, as well as in the form of FIGS. 1-8, if only one rail is being broken, a short length of rail is simply laid on deck 38, in guideway 43, to be alternately gripped and released by clamp 46, but without being moved to the work station 37.

It will be seen that the present invention provides a combined rail lifting and breaking apparatus to lift the rails off the bed of a railroad track and break the rails into manageable short lengths in a single operation so that the short lengths of rails may be piled or transported away from the job site immediately.

What is claimed is:

1. A method of breaking railroad track rails of the type having a top with a head and a bottom with a base flange and having obverse and reverse sides, consisting in the steps of supporting and confining the rail against tilting to its side, placing the rail across a stationary anvil whereby an edge of the anvil traverses the obverse sides of the rail, applying clamping pressure against the reverse side of the rail adjacent the anvil and simultaneously forming notches in the reverse sides of both the head and base flange of the rail, and subsequently applying breaking force against the reverse side of the rail and adjacent the notches to break the rail over the anvil and in a sideward direction.

2. A machine for lifting and breaking rails of a railroad track, comprising a mobile frame for travel along the road bed of the railroad track and having pressure applying means bearing downwardly on the wooden ties adjacent the rails, guiding means on the frame and above the pressure applying means and bearing upwardly against the rails and directing the rails divergently upwardly from the wooden ties, and an anvil and breaker assembly connected with the frame and adjacent the guiding means and including an anvil and a powered breaker shoe between which the rail extends, the breaker shoe moving against the rail and cooperating with the anvil to break off lengths of the rail, and the anvil and breaker assembly including an inclined rail supporting slide carrying the anvil and breaker shoe and adapted for fore and aft sliding movement relative to the forward travel along the road bed and including a deck plate supporting the rails.

3. A machine for lifting and breaking rails according to claim 2 and the slide having clamp means to hold the slide and rails stationary to each other.

4. A machine for lifting and breaking rails according to claim 3 and the clamp means including a rail engaging means for producing a nick in the rail adjacent the anvil and breaker assembly to establish the location of breaking of the rail.

5. A machine for lifting and breaking rails according to claim 2 and a hydraulic ram between the frame and the slide and connected for moving the slide in the direction of travel of the mobile frame along the road bed.

6. A machine for lifting and breaking rails according to claim 5 and feeler means sensing completion of the movement of the breaker shoe, the hydraulic ram responding to indications of the feeler means to move the slide.

7. A machine for lifting and breaking rails according to claim 2 and feeler means on the slide and engaging the end of a rail moving over the slide, the feeler means being connected with the fulcrum and breaker assembly to commence operation thereof.

8. Apparatus for breaking a railroad track rail of the type having a top with a head and a bottom with a base flange and having obverse and reverse sides, comprising
guide means at the obverse side of the rail and having an anvil with an engaging face confronting the obverse side of the rail and adjacent an unobstructed space along which a cantilever end portion of the rail extends,
a pressure shoe opposite said unobstructed space and mounted for movement toward the reverse side of the rail and toward the space, the pressure shoe having an engaging face to bear against and apply pressure on the reverse side of the rail, driving means moving the pressure shoe against the rail for breaking the rail,
and clamp means having an engaging face confronting the reverse side of the rail and defining a notching blade adjacent the anvil, means producing relative convergent movement between the guide means and clamp means to retain the rail and cause notching by the blade of the reverse side of the rail, one of said engaging faces being shaped for simultaneously engaging spaced portions of the side of the rail to prevent tilting of the rail about longitudinal axes.

9. Apparatus for breaking a railroad track rail according to claim 8 and the clamp means having an elongate jaw extending along the reverse side of the rail and away from the pressure shoe and notching blade, the guide means being stationary and the elongate jaw and notching blade being movable toward and away from the side of the rail.

10. Apparatus for breaking a railroad track rail according to claim 9 and the elongate jaw being mounted on a pivot spaced from the notching blade.

11. Apparatus for breaking a railroad track rail of the type having a top with a head and a bottom with a base flange and having obverse and reverse sides, comprising
supporting and guide means supporting the rail and having an anvil with an engaging face at the obverse side of the rail and adjacent an unobstructed space along which a cantilever end portion of the rail extends,
a pressure shoe opposite said unobstructed space and mounted for movement toward the reverse side of the rail and toward the space, the pressure shoe having an engaging face to bear against and apply pressure on the reverse side of the rail, driving means moving the pressure shoe against the rail for breaking the rail,
and an elongate clamp jaw with an engaging face confronting the reverse side of the rail, the clamp jaw having an end portion opposite the anvil and having a notching blade thereon, and means to move the clamp jaw and notching blade against the side of the rail, one of said engaging faces being shaped for simultaneously engaging spaced portions of the side of the rail to prevent tilting of the rail about longitudinal axes.

12. Apparatus for breaking a railroad track rail according to claim 11 and the notching blade being shaped to conform to the side of the rail and to engage and notch both side of the head and the side of the flange of the rail.

13. Apparatus for breaking a railroad track rail according to claim 11 and the engaging face of the pressure shoe being shaped for simultaneously engaging spaced portions of the side of the rail and applying pressure thereagainst.

14. Apparatus for breaking a railroad track rail having relative movement in a direction longitudinally of the rail with respect to the breaker apparatus, comprising
a frame to receive a rail thereon in one direction longitudinally of the rail, a slide on the frame and being reciprobable longitudinally of the rail to alternately travel with the rail and travel oppositely to the rail,
guide means including an anvil across which the rail extends, there being an unobstructed space adjacent the anvil along which a cantilever end portion of the rail extends,
rail clamping and notching means on the slide adjacent the anvil to simultaneously notch the rail and clamp the rail to the slide,
a rail breaking pusher on the slide and adjacent the anvil for breaking the rail over the anvil,
and means for moving the slide in a direction opposite to said one direction.

15. The apparatus for breaking a railroad track rail of the type having a top with a head and a bottom with a base flange, and having obverse and reverse sides, according to claim 14, and wherein said rail clamping and notching means confronts and bears against the reverse side of the rail and produces a notch in the reverse sides of the base flange and head of the rail, and said rail breaking pusher applying breaking force against one of the sides of the rail.

* * * * *

UNITED STATES PATENT AND TRADEMARK OFFICE
CERTIFICATE OF CORRECTION

PATENT NO. : 4,522,323
DATED : June 11, 1985
INVENTOR(S) : Roy E. LaBounty

It is certified that error appears in the above–identified patent and that said Letters Patent are hereby corrected as shown below:

Column 14, line 15, after "both", insert --the--.

Signed and Sealed this

Third Day of December 1985

[SEAL]

Attest:

Attesting Officer

DONALD J. QUIGG

Commissioner of Patents and Trademarks